Jan. 6, 1931.   J. BRUNNER   1,788,047
TRAP
Filed July 10, 1929
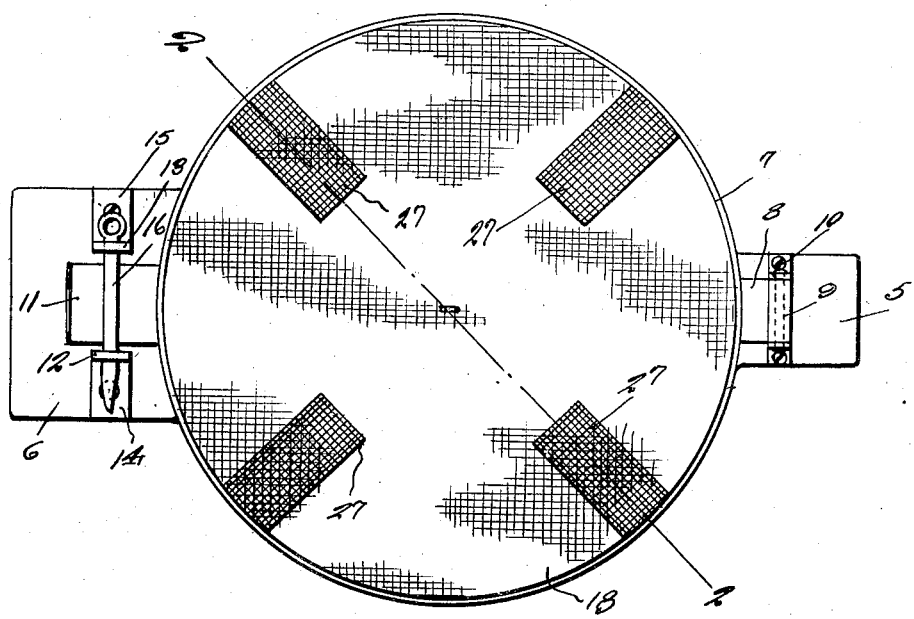
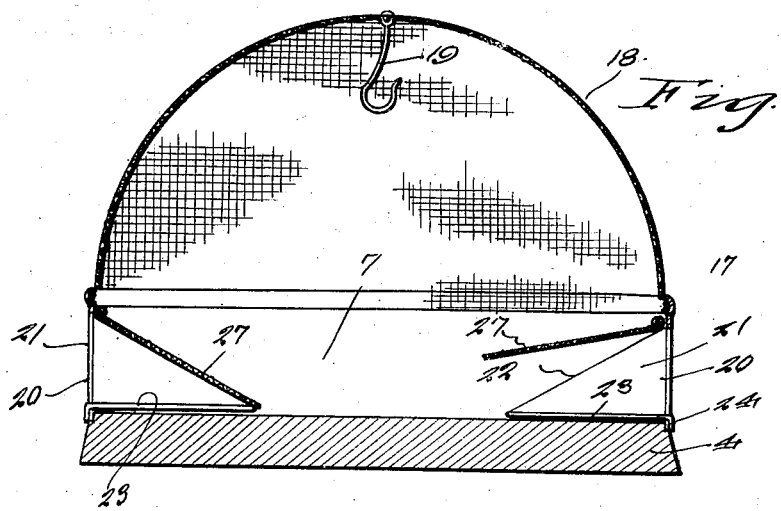
Inventor
John Brunner
By Clarence A. O'Brien
Attorney Patented Jan. 6, 1931

1,788,047

UNITED STATES PATENT OFFICE

JOHN BRUNNER, OF NEWPORT, KENTUCKY

TRAP

Application filed July 10, 1929. Serial No. 377,232.

This invention relates to traps and an object of the invention is to provide a trap which is extremely simple in its method of assembly, very efficient for its intended purpose, strong, compact and durable, affording easy admission to the victim to be trapped, and comparatively inexpensive to manufacture and assemble.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to, without departing from the spirit of the claim hereunto appended.

In the drawings, wherein like reference characters denote corresponding parts throughout the several views:

Figure 1 is a top plan view of the present invention.

Figure 2 is a transverse vertical detail sectional view, taken substantially on the line 2—2 of Figure 1, and Figure 3 is a fragmentary vertical section in detail, illustrating the closure disposed over the runway.

Referring particularly to the drawings, 4 indicates a circular base formed of wood, metal or other imperforate material, having an extension 5 projecting laterally from one circumferential edge thereof and another extension 6 extending laterally from the diametrically opposite circumferential edge of the base.

While the base has been described as being round, it is within the contemplation to have the base formed of any configuration.

It is furthermore pointed out that when the trap is utilized for use in the water for fish, muskrats or the like, the base 4 should be formed of foraminous material, so as to permit the easy movement thereof through the water.

Superimposed edgewise upon the base 4, in a vertical position is a casing 7, having upstanding imperforate side walls and open bottom and open top. The casing 7 rests upon the base 4 under its own weight and has an arm 8 secured thereto and extending laterally from its lower edge from one side thereof.

The arm 8 is formed with a sleeve 9 at its outer end, whereby the casing is hingedly connected to the section 5, as indicated at 10. From the opposite side of the casing, adjacent the lower edge thereof extends a flat plate 11, which is received between the upstanding legs 12, 13, of a pair of right angled lugs 14, 15, coupled to the extension 6. The upstanding legs 12, 13, have aligned openings therein, through which extends a coupling pin 16, for detachably locking the arm 11 to hold the casing in superimposed position upon the base 4. At the upper edge, the casing 7 is formed with an inwardly directed arcuate groove 17, extending about its perimeter, in which is anchored the lower edge of a cover 18, formed of reticulated fabric such as wire, netting or the like, capable of sustaining its shape under its own weight. Depending from the cover, interiorly thereof is a bait hook 19, connected at its upper end to the cover.

A plurality of openings extend through the casing wall 7 and extending interiorly therefrom are a plurality of runways 21 said runways substantially U-shaped in cross section. The opposite sides of the runway decline inwardly from their outer ends and are formed of imperforate material, such as metal or the like. There is one runway leading from the interior of the casing to each of the plurality of openings.

The inwardly declining side walls are indicated at 22. The floors 23 of the runways are formed with a depending flange 24, which is soldered or otherwise secured in abutting relation to the lower edge of the casing 7, adjacent the openings 20. A pair of lugs 25, are soldered or otherwise secured adjacent the upper edge of the casing 7, overlying the upper edges of each runway 21.

Hingedly connected between the apertured lugs 25 as at 26, is a foraminous closure 27, adapted to swing on the pivots 26 and rest by gravity on the upper edges of the side walls of the runways 21, so that the victim coming into the runway may push its way to the interior of the trap. One of the closures 27 is shown in open position in Figure 2 of the drawings, while another is shown in a closed position. There is a hinged closure 27 provided for each runway for the purpose of permitting admittance into the interior of the trap, while at the same time to prevent the victim from escaping therefrom.

While the drawings illustrate the present invention with an annular casing 7 and a semi-spherical reticulated cover 18, it is within the contemplation of the invention to have a polygonal base 4 and a casing 7, and a cover 18 of the same configuration.

It is to be understood that by describing in detail herein any particular form, structure or arrangement, it is not intended to limit the invention beyond the terms of the several claims or the requirements of the prior art.

What is claimed is:

A trap of the character described comprising a base, an imperforate casing superimposed upon the base, said casing having an open bottom closed by the base when the casing is mounted thereon, the casing further having an open top, means on one side of the casing for hingedly connecting said casing to the base, means on the opposite side of the casing for releasably securing same to the base, a hollow reticulated cover secured to the upper portion of the casing, bait supporting means in the cover, the casing being still further provided with a plurality of spaced openings in its lower portion, runways extending inwardly over the base from the openings, and inwardly opening closures hingedly mounted adjacent the upper edges of the runways, said runways being substantially U-shaped in cross section and having the upper edges of their side walls declining from their outer ends to their inner ends, the marginal side portions of the closures being engageable for rest on the upper edges of the side walls of the runways when the closures are in closed position.

In testimony whereof I affix my signature.

JOHN BRUNNER.